(12) United States Patent
Lee

(10) Patent No.: US 6,956,837 B1
(45) Date of Patent: Oct. 18, 2005

(54) METHOD FOR HANDOFF OF MEDIUM RATE DATA CALL IN MOBILE COMMUNICATION SYSTEM

(75) Inventor: Hyun Goo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 809 days.

(21) Appl. No.: 09/691,163

(22) Filed: Oct. 19, 2000

(30) Foreign Application Priority Data

Oct. 21, 1999 (KR) ............................... 1999/45870

(51) Int. Cl.$^7$ ............................................ H04Q 7/00
(52) U.S. Cl. .................................................. 370/331
(58) Field of Search ...................... 370/252, 331–332, 370/342, 333; 445/442

(56) References Cited

U.S. PATENT DOCUMENTS 6,590,879 B1 * 7/2003 Huang et al. ............... 370/331
6,816,472 B1 * 11/2004 Dillon et al. ............... 370/331

* cited by examiner

Primary Examiner—Phirin Sam
Assistant Examiner—Robert W. Wilson
(74) Attorney, Agent, or Firm—Fleshner & Kim, LLP

(57) ABSTRACT

The present invention relates to a mobile communication system, and more particularly, to a method for a handoff of a medium rate data call in a mobile communication system. In the present invention, if the pilot strength of the BTS in the active set to which a SCH is not allocated is smaller than the pilot strength of the BTS to which the SCH is not allocated for a predetermined period of time, the mobile station transmits the corresponding information to the base station by means of a PSMM, and the base station performs a handoff of the SCH resource according to the PSMM. In addition, if the base station receives the PSMM from the mobile station, whether or not the SCH is allocated is determined using the pilot strength of the corresponding BTS, reference threshold, and T_ADD. Therefore, frequent handoffs are prevented and the load of the mobile station is reduced because there is no need to compute a SCH reference threshold at every handoff request. Moreover, it is made possible to maintain a constant data rate and provide a medium rate data service by performing a handoff of an available SCH.

12 Claims, 3 Drawing Sheets

METHOD FOR HANDOFF OF MEDIUM RATE DATA CALL IN MOBILE COMMUNICATION SYSTEM

BACKGROUND OF THE INVENTION

1. Field of the Invention

The present invention relates to a mobile communication system, and more particularly, to a method for a handoff of a medium rate data call in a mobile communication system.

2. Description of the Background Art

Generally, a handoff in a mobile communication system is a function of keeping a call in service from being disconnected when a mobile station moves from the current service area to other adjacent service area.

FIG. 1 is a block diagram illustrating the construction of a general mobile communication system.

As illustrated therein, the mobile communication system includes: a mobile station 1 operated during movement or while stopping at a undetermined spot; a base station subsystem(BS) 10 for processing a call from the mobile station 1 via a radio interface with the mobile station 1; and a mobile switching center(MSC) 20 switching the call transmitted from the base station 10 to a corresponding subscriber. The base station 10 includes: a BTS(base station transceiver subsystem) 11 for interfacing with the mobile station 1; and a BSC(base station controller) 12 for processing a call transmitted from the BTS 11 and controlling the BTS 11.

Handoffs in a mobile communication system for providing a voice service according to the IS-95 and IS-95A standards include the ADD Threshold(T_ADD), DROP Threshold(T_DROP), COMPARISON Threshold (T_COMP), and DROP TIMER Threshold(T_TDROP).

The T_ADD is a minimum pilot strength capable of maintaining an available speech channel, e.g., a threshold of a pilot strength that is used by the mobile station 1 in order to demand a handoff. The T_DROP is a pilot strength which is required for the release of an unavailable speech channel. The T_COMP is a threshold used to demand a handoff of the BTS in a candidate set. The T_TDROP is a timer used to drop the handoff BTS lower than the T_DROP.

The mobile station 1 manages the BTS by dividing it into an active set, candidate set, and neighbor set when it performs a handoff. The active set is a set of BTSs having a pilot strength more than T_ADD and currently providing a service to the mobile station 1. The candidate set is a set of candidate BTSs having a pilot strength more than T_ADD, but currently preparing to provide a service to the mobile station 1. The neighbor set is a set of BTSs neighboring to the BTSs belonging to the active set and the candidate set.

FIG. 2 is a diagram illustrating a handoff method when a voice service is provided according to the IS-95 and IS-95A standards in a mobile communication system.

As illustrated therein, the mobile station 1 stores the T_ADD, T_DROP, T_COMP, and T_TDROP which are a handoff decision element contained in a paging message transferred when being paged by the base station 10.

After a call is set up via a serving base station 10, the mobile station 1 measures the pilot strength of the serving base station 10 and the pilot strength of neighbor or remaining BTSs(base station subsystems) classified as the neighbor set.

Thereafter, when the pilot strength of the BTS classified as the neighbor set becomes more than T_ADD, the mobile station 1 transfers a pilot strength measurement message (PSMM) having the pilot information and pilot strength of the BTSs in the neighbor set and the pilot strength thereof to the serving base station 10, and includes the BTS generating this pilot signal into the neighbor set (a).

The serving base station 10 analyzes the transferred PSMM, and transfers a handoff direction message containing this pilot signal to the mobile station 1 (b).

The mobile station 1 includes the BTS generating this pilot signal into the active set, and reports the completion of the ADD handoff to the base station 10 (c).

Afterwards, when the pilot strength of the serving base station 10 classified as the existing active set becomes less than T_DROP, the mobile station 1 drives the T_TDROP (d). When the driven T_TDROP is finished, the mobile station 1 transfers the PSMM to the serving base station 10 (e).

The serving base station 10 analyzes the transferred PSMM and transfers a handoff direction message containing a pilot information of the corresponding BTS which satisfies the active set with the pilot strength, to the mobile station 1 (f). The mobile station 1 moves the serving base station 10 from the active set to the neighbor set according to the handoff direction message, and reports the completion of the DROP handoff (g).

In this way, in case of providing a voice service according to the IS_95 or IS-95A standards, the handoff method has a problem that a handoff is frequently occurred according to a radio state, because the PSMM is transferred to the base station when the pilot strength of a neighbor BTS becomes more than T_ADD. In addition, there is a problem that system load is increased and sound quality is degraded due to the frequent occurrence of allocation/deadlocation of resources.

In case of implementing a data service of a medium data rate(64 Kbps) in a conventional mobile communication system in which such 8 Kbps and 13 Kbps voice services are provided, physical radio resources are additionally required in order to increase a data rate. An additional allocation of radio resources for the implementation of a medium rate data service results in the more frequent occurrence of allocation/deadlocation of resources, and thus an improved handoff method is proposed in the IS-95B standard in order to compensate these problems.

In other words, four fields are added to a conventional system parameter and handoff direction message. The four fields includes SOFT_SLOPE, ADD_INTERCEPT, DROP_INTERCEPT, and P_REV. The SOFT_SLOPE is a parameter for deciding whether the mobile station performs a handoff procedure according to the IS-95 and IS-95A standards or performs a handoff procedure according to the IS-95B standard. If the SOFT_SLOPE field has a value of "0", the mobile station conforms to the handoff procedure according to the IS-95 and IS-95A standards, or if it has other values, the mobile station conforms to the handoff procedure according to the IS_95B standard.

When the mobile station receives a paging message containing the four files from the BTS, it stores the same.

Afterwards, in the case that a data call is set up and the SOFT_SLOPE is not "0", when the pilot strength of an arbitrary BTS belonging to the neighbor set becomes more than T_ADD, the mobile station computes a new dynamic threshold using the SOFT_SLOPE and ADD_INTERCEPT and includes the arbitrary BTS into the candidate set. The mobile station judges if the pilot strength of the BTS included in the candidate set is larger than the dynamic threshold.

If the pilot strength of the BTS is larger than the dynamic threshold, the mobile station transfers a PSMM containing the corresponding pilot information and pilot strength to the BTS. The subsequent ADD handoff procedure is achieved in the same way as the handoff procedure conforming to the IS-95 and IS-95A standards.

In addition, in case of DROP of the BTS belonging to the active set, the mobile station computes a new dynamic threshold using the SOFT_SLOPE and DROP_INTERCEPT The mobile station compares the pilot strength of the BTS belonging to the active set with the computed dynamic threshold. As the result of the comparison, if the pilot strength of the BTS belonging to the active set is lower than the dynamic threshold, the T_TDROP is driven.

If the pilot strength of the BTS is lower than the dynamic threshold after the driven T_TDROP is finished, a PSMM containing the corresponding pilot strength and corresponding pilot information to the base station. The subsequent DROP handoff procedure is achieved in the same way as the handoff procedure conforming to the IS-95 and IS-95A standards.

In case of the ADD handoff, the SOFT_SLOPE and ADD_INTERCEPT are set such that the dynamic threshold using the SOFT_SLOPE and DROP_INTERCEPT is higher than T_ADD in general. Also in case of the DROP handoff, the SOFT_SLOPE and DROP_INTERCEPT are set such that the dynamic threshold using the SOFT_SLOPE and DROP_INTERCEPT is higher than T_DROP. In addition, the SOFT_SLOPE, ADD_INTERCEPT and DROP_INTERCEPT can be reset by a system operator according to a radio environment.

Such a method for a handoff of a medium rate data call according to the IS-95B standard has an effect that a frequent handoff is prevented by setting a dynamic threshold higher than T_ADD and T_DROP. On the other hand, there occurs a problem that, since the mobile station must compute a dynamic threshold for the ADD handoff and a dynamic threshold for the DROP handoff each time, the load of the mobile station is increased.

In addition, since a voice service according to the IS-95 and IS-95A standards is transferred via FCH along with data in voice, only the FCH is considered during handoff. However, in case of a medium rate data service, a signal is transferred via a fundamental channel(FCH), and data is transferred via a supplemental channel(SCH). Thus, in the method for handoff of a medium rate data call according to the IS-95B standard in the conventional art, FCHs and SCHs are allocated to all BTSs of the active set, and these two kinds of channels are dropped at the same time without discriminating the FCH from the SCH. Therefore, in the method for handoff of a medium rate data call according to the IS-95B standard in the conventional art, there arises a problem that, since the FCHs and SCHs are allocated to all BTSs in the active set, the utilization efficiency of an available SCH of the base station is degraded.

SUMMARY OF THE INVENTION

Accordingly, it is an object of the present invention to provide a method for handoff of a medium rate data call in a mobile communication which is capable of effectively processing an SCH so that a medium rate data service can be provided while maintaining a constant data rate during a handoff of a data call.

It is another object of the present invention to provide a method for handoff of a medium-rate data call in a mobile communication system which is capable of preventing a frequent handoff of the SCH and reducing the load of a mobile station without computing a reference threshold at every handoff request by presetting a reference threshold which is considered as an SCH handoff reference of a medium rate data call higher than T_ADD or T_DROP.

To achieve the above objects, there is provided a method for handoff of a medium rate data call in a mobile communication system according to the present invention which includes: the step in which, when the pilot strength of a BTS to which a SCH is allocated is smaller than the pilot strength of the BTS to which the SCH is not allocated among the BTSs in an active set for more than a predetermined period of time, a mobile station transmits the corresponding information to a base station by means of a PSMM; and the step in which the base station performs a handoff of a SCH resource to a BTS to which the SCH is not allocated according to the PSMM.

To achieve the above objects, there is provided a method for requesting a handoff of a medium rate data call of a mobile station according to the present invention which includes: a first step of measuring the pilot strength of a BTS to which a SCH is allocated and the pilot strength of a BTS to which the SCH is not allocated among the BTSs in an active set; and a second step of transmitting a corresponding information to a base station by means of a PSMM, if the pilot strength of the BTS to which the SCH is allocated is smaller than the pilot strength of the BTS to which the SCH is not allocated for more than a predetermined period of time as the result of the measurement.

To achieve the above objects, there is provided a method for performing a handoff of a medium rate data call of a base station according to the present invention which includes: a first step of analyzing a PSMM transmitted from a mobile station; a second step of comparing the pilot strength of a BTS to which a SCH is allocated with the pilot strength of a BTS to which the SCH is not allocated, if the allocation of the SCH is required as the result of the analysis; a third step of allocating a SCH to the BTS to which the SCH is not allocated and the BTS to which a SCH is allocated, if the pilot strength of the BTS to which the SCH is not allocated is larger than the pilot strength of the BTS to which the SCH is allocated as the result of the comparison, and the pilot strength of the BTS to which the SCH is allocated is more than T_ADD; and a fourth step of allocating the SCH to a BTS having a largest pilot strength, if all BTSs in the active set are not allocated the SCH, when a DROP of the BTS to which the SCH is allocated is required as the result of the analysis.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The preferred embodiments of the present invention will now be described with reference to the accompanying drawings.

First, in case of data service, a handoff of a FCH is done by a handoff method according to the existing radio standards. Thus, in the present invention, the handoff of a FCH is not considered, but a handoff of a SCH is considered. In addition, in case of handoff of a medium rate data call, all BTSs in an active set are not allocated a FCH and a SCH, but only a predetermined number of BTSs having a pilot strength enough to combine pilot signals by a mobile station are allocated both FCH and SCH.

Figure 1:
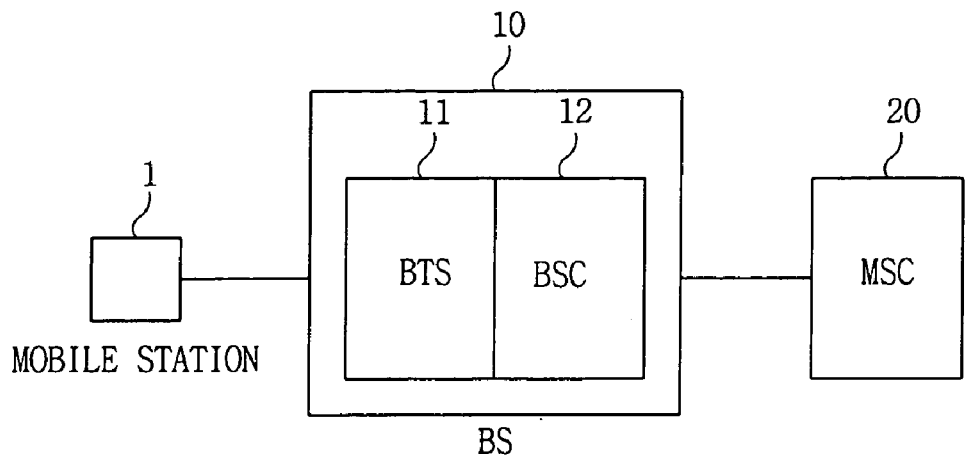
FIG. 1 is a block diagram illustrating an example of the construction of a general mobile communication system.
Figure 2:
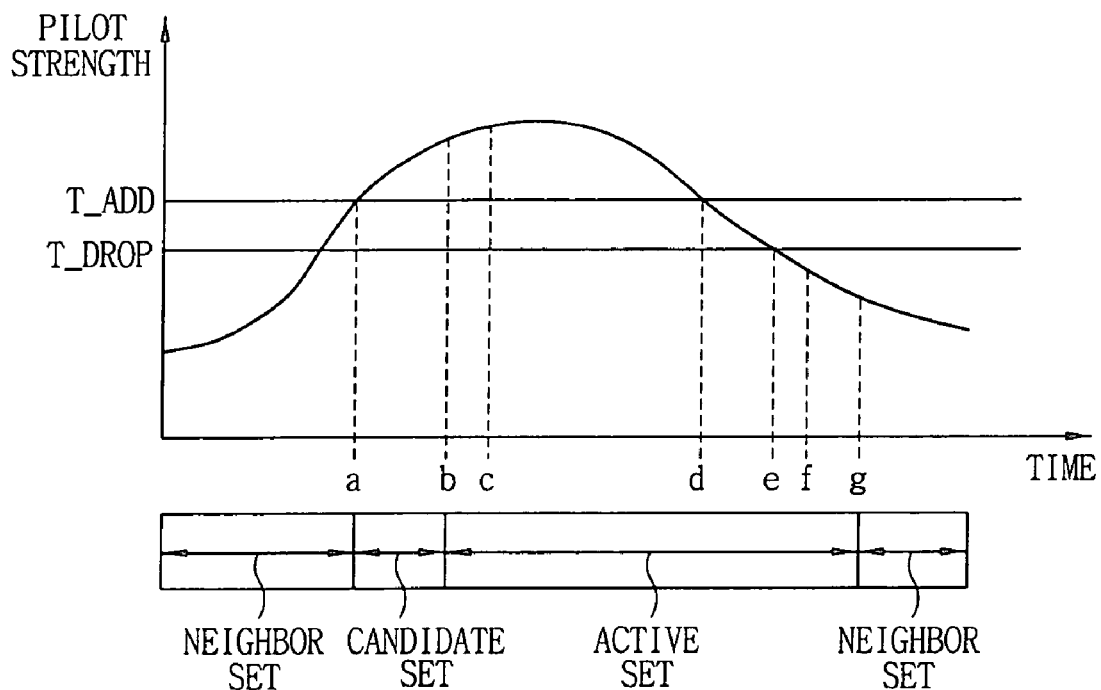
FIG. 2 is a diagram illustrating a handoff method when a voice service is provided according to the IS-95 and IS-95A standards in a mobile communication system.

The present invention is adapted to a mobile communication system illustrated in FIG. 1. First of all, the present invention is described in two embodiments. In one embodiment, a conventional handoff procedure is performed in a base station, and a new method for requesting a handoff of a medium rate data call in a mobile terminal is newly proposed. In the other embodiment, a conventional handoff procedure is performed in a mobile station, and a method for requesting a handoff of a medium rate data in a base station is newly proposed.

Figure 3:
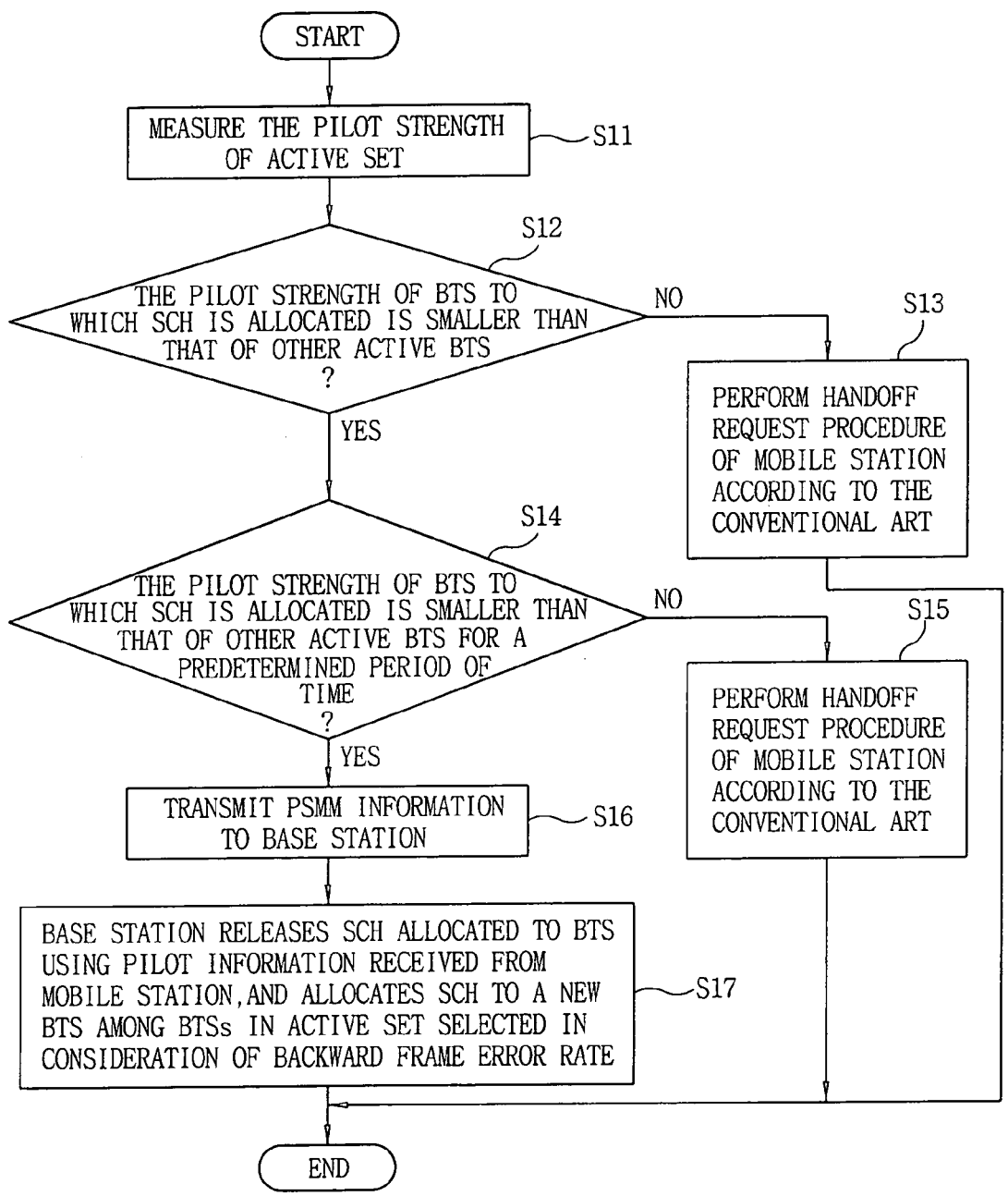
FIG. 3 is a flow chart illustrating a method for requesting a handoff of a medium rate data call in a mobile station according to the present invention.

First, FIG. 3 is a flow chart illustrating a method for requesting a handoff of a medium rate data call in a mobile station according to one embodiment of the present invention.

As illustrate therein, the mobile station measures the pilot strength of a BTS (BTS in an active set) enough to currently combine pilot signals in S11.

Thus, it is judged if the pilot strength of a BTS to which a SCH is allocated is smaller than the pilot strength of a BTS to which a SCH is not allocated among pilot signals of the BTSs currently contained in the active set in S12.

As the result of the judgement, if the pilot strength of the BTS to which a SCH is allocated is not smaller than the pilot strength of other active BTS to which a SCH is not allocated, the mobile station performs the conventional handoff requesting procedure in S13.

However, as the result of the judgement of S12, if the pilot strength of the BTS to which a SCH is allocated is smaller than the pilot strength of other active BTS to which a SCH is not allocated, the mobile station judges if the above state is maintained for more than a predetermined period of time in S14.

As the result of the judgment of S14, since the pilot condition of the BTS in the active set is continuously changed, the mobile station performs the conventional handoff procedure if the pilot strength of other active BTS to which a SCH is not allocated is not maintained at a smaller state, the mobile station performs the existing handoff procedure in S15.

However, as the result of the judgement of S14, if the pilot strength of the BTS to which a SCH is allocated is smaller than the pilot strength of other active BTS to which a SCH is not allocated for more than a predetermined period of time, the mobile station transmits the corresponding information to the base station by a PSMM even though the pilot strength of other active BTS to which a SCH is not allocated does not satisfy T_DROP and T_TDROP among handoff reference values in S16. Thus, the mobile station prevents a frequent PSMM transmission.

By means of the PSMM transmitted from the mobile station, the base station judges that the pilot strength of the BTS to which a SCH is allocated becomes lower than the pilot strength of the BTS to which a SCH is not allocated, thus releasing the SCH allocated to the BTS and requesting the allocation of a SCH to the BTS to which the SCH is not allocated. When requesting the allocation the SCH, the base station selects a BTS to request the allocation of the SCH in consideration of a backward frame error rate by each BTS if there exist a plurality of BTSs to which a SCH is not allocated in the active set in S17.

Consequently, in the method for requesting a handoff of a medium rate data call in a mobile station according to the present invention, there is no need to compute a dynamic threshold, which is a handoff reference value, at every handoff request for thereby reducing the load of the mobile station.

Figure 4:
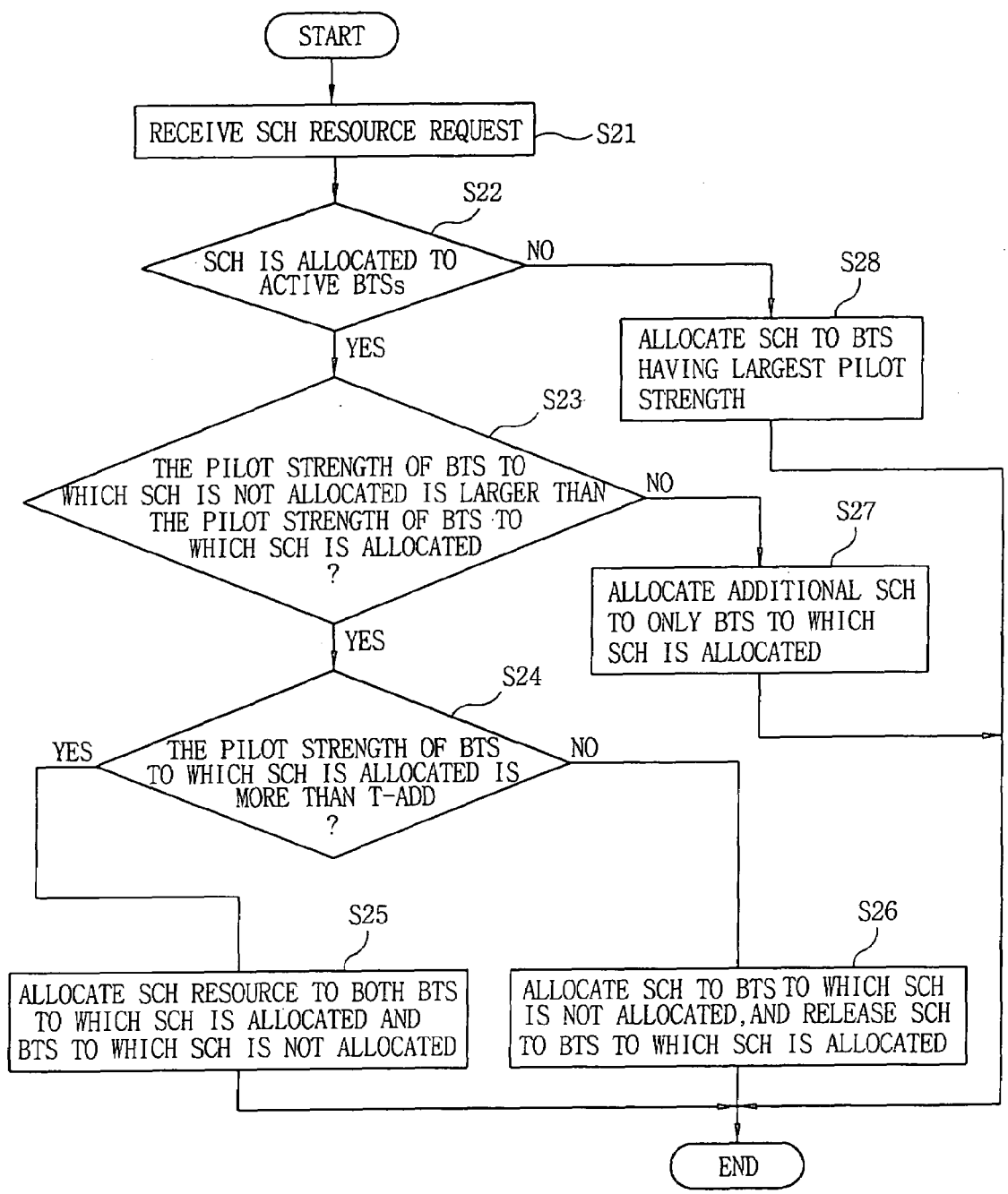
FIG. 4 is a flow chart illustrating a method for a handoff of a medium rate data call in a base station according to the present invention.

Next, FIG. 4 is a flow chart illustrating a method for a handoff of a medium rate data call in a base station according to another embodiment of the present invention.

When the mobile station during the medium rate data call requests the allocation of an SCH by means of a PSMM according to the existing radio standard, the base station checks whether the SCH is allocated to a BTS in the active set in S21 and S22. As the result of the checking, if there is a BTS to which a SCH is allocated, the base station compares the pilot strength of an active BTS to which a SCH is not allocated with the pilot strength of a BTS to which SCH is allocated in S23.

As the result of the comparison in S23, if the pilot strength of the BTS to which a SCH is not allocated is larger than the pilot strength of the BTS to which a SCH is allocated, the base station judges if the pilot strength of the BTS to which a SCH is allocated is more than T_ADD in S24.

Thus, if the pilot strength of the BTS to which a SCH is allocated is more than T_ADD, the base station additionally allocates a SCH resource to the BTS to which a SCH is allocated and the BTS to which a SCH is not allocated in S25.

In addition, both the pilot strength of the BTS to which a SCH is allocated and the pilot strength of the BTS to which a SCH is not allocated are larger than a reference threshold, the base station additionally allocates a SCH resource to the BTS to which a SCH is not allocated and the BTS to which a SCH is allocated. The reference threshold is a value which is previously set by a radio environment test. In case of ADD handoff, the reference threshold is set higher than T_ADD and in case of DROP handoff, the reference threshold is set higher than T_DROP, for thereby preventing a frequent handoff and making it unnecessary to compute a reference threshold at every handoff request.

However, as the result of the judgement in S24, if the pilot strength of the BTD to which a SCH is allocated is not larger than T_ADD, the base station allocates a SCH to an active BTS to which a SCH is not allocated, and performs the release of the SCH resource with respect to the BTS to which the SCH is allocated in S26.

In addition, as the result of the comparison in S23, if the pilot strength of the BTS to which a SCH is not allocated is not larger than the pilot strength of the BTS to which a SCH is allocated, the base station additionally allocates a SCH to only a BTS to which the SCH is allocated in S27.

In case of a handoff of a new pilot signal having a pilot strength larger than that of the BTS to which a SCH is allocated, if the pilot strength of the BTS of which an ADD handoff is to be performed is larger than the reference threshold of the SCH is performed by simultaneously allocating both FCH and SCH to the BTS.

In addition, if a PSMM is a request for a DROP handoff as the result of analyzing the PSMM transmitted from the mobile station, the base station checks whether or not all BTSs in the active set turn to the state where a SCH is not allocated to them, when the DROP handoff of the BTS to which the SCH is allocated is performed. Thus, if all BTSs in the active set turn to the state where a SCH is not allocated to them, when the DROP handoff of the BTS to which the SCH is allocated is performed, the base station allocates the SCH to a BTS having a largest pilot strength among the BTSs in the active set in S28.

For reference, the number of BTSs of active set with respect to the SCH is set to less than six, which is the number of BTSs of the FCH active set, in order to prevent an excessive waste of radio resources.

As described above, in the method for a handoff of a medium rate data call in a mobile communication system according to the present invention, if the pilot strength of the BTS in the active set to which a SCH is not allocated is smaller than the pilot strength of the BTS to which the SCH is not allocated for a predetermined period of time, the mobile station transmits the corresponding information to the base station by means of a PSMM, and the base station performs a handoff of a SCH resource according to the PSMM, thus maintaining a constant data rate and providing a medium rate data service.

In addition, in the present invention, the reference threshold, which is a handoff reference value, is set higher than T_ADD or T_DROP, thereby preventing frequent handoffs and reducing the load of the mobile station because there is no need to compute a reference threshold at every handoff request.

In addition, in a medium rate data service using a FCH and a SCH, a SCH handoff has an effect of effectively using a SCH resource by performing a handoff of only a predetermined number of BTSs (less than six) which can be combined by the mobile station.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A method for handoff of a medium rate data call in a mobile communication system, comprising:
    comparing a pilot strength of a BTS (Base Station Transceiver Subsystem) to which a SCH (Supplemental Channel) is allocated to a pilot strength of a BTS to which the SCH is not allocated, without comparing the pilot strengths to a predetermined threshold value;
    transmitting a PSMM (Pilot Strength Measurement Message) from a mobile station to a base station including the BTS to which the SCH is allocated when the pilot strength of the BTS to which the SCH is allocated is smaller than the pilot strength of the BTS to which the SCH is not allocated; and
    performing a handoff of the SCH to the BTS to which the SCH is not allocated, according to the PSMM.

2. The method according to claim 1, wherein, for a medium rate data service, a FCH (Fundamental Channel) handoff procedure and a SCH handoff procedure are separately performed.

3. The method according to claim 2, wherein a SCH handoff is performed with respect to a predetermined number of BTSs having a pilot strength strong enough to combine both FCH and SCH pilot signals by the mobile station among the BTSs communicating with the mobile station.

4. A method for requesting a handoff of a medium rate data call of a mobile station, comprising:
    measuring a pilot strength of a BTS (Base Station Transceiver Subsystem) to which a SCH (Supplemental Channel) is allocated and a pilot strength of another BTS to which the SCH is not allocated;
    comparing the pilot strength of the BTS to which the SCH is allocated with the pilot strength of the another BTS to which the SCH is not allocated, without comparing the pilot strengths to a threshold; and
    transmitting a PSMM (Pilot Strength Measurement Message) to a base station including the another BTS requesting a handoff, when the pilot strength of the BTS to which the SCH is allocated is smaller than the pilot strength of the BTS to which the SCH is not allocated as the result of the measurement.

5. A method for performing a handoff of a medium rate data call of a base station:
    analyzing a PSMM (Pilot Strength Measurement Message) transmitted from a mobile station;
    comparing a pilot strength of a first BTS (Base Station Transceiver Subsystem) to which a SCH (Supplemental Channel) is allocated with a pilot strength of a second BTS to which the SCH is not allocated, if the allocation of the SCH is required, without comparing the pilot strengths to other variables;
    allocating the SCH to both of the first and second BTSs, if the pilot strength of the second BTS is larger than the pilot strength of the first BTS as the result of the comparison and the pilot strength of the first BTS is higher than T_ADD; and
    allocating the SCH to a BTS having a largest pilot strength, if analyzing the PSMM determines the SCH is not allocated to any BTS, when a DROP of the BTS to which the SCH is allocated is required.

6. The method according to claim 5, wherein if the pilot strength of the second BTS is larger than the pilot strength of the first BTS, and the pilot strength of the first BTS to which the SCH is allocated is not higher than T_ADD, the allocation of the SCH to the second BTS is performed and the release of the SCH resource from the first BTS is performed.

7. The method according to claim 5, wherein, as the result of comparing, if the pilot strength of the second BTS is larger than the pilot strength of the first BTS, it is judged that a new pilot signal corresponding to the pilot strength of the second BTS is to be added, and if the pilot strength of the BTS of which a handoff is to be performed is higher than a reference threshold, a handoff is performed by simultaneously allocating both FCH and SCH to the BTS of which the handoff is to be performed.

8. The method according to claim 7, wherein the reference threshold, which is a value previously set by a radio environment test, is set higher than T_ADD for the ADD handoff, and is set higher than T_DROP for a DROP handoff.

9. The method according to claim 5, wherein a total number of BTSs included in an active set is set to less than six.

10. A handoff method, comprising:
    comparing a pilot strength of a first BTS (Base Station Transceiver Subsystem) to which a SCH (Supplemental Channel) is allocated with a pilot strength of a second BTS to which a SCH is not allocated, without referring to threshold values; and performing a handoff to the second BTS when the pilot strength of the first BTS is smaller than the pilot strength of the second BTS.

11. The method of claim 10, wherein a FCH (Fundamental Channel) handoff procedure and a SCH handoff procedure are separately performed.

12. The method according to claim 10, wherein the SCH handoff is performed with respect to a predetermined number of BTSs having a pilot strength strong enough to combine both FCH and SCH pilot signals by the mobile station among the BTSs communicating with the mobile station.

\* \* \* \* \*